J. C. SHELER AND R. B. AUSTIN.
FLEXIBLE COUPLING.
APPLICATION FILED NOV. 19, 1919.
1,342,300.
Patented June 1, 1920.
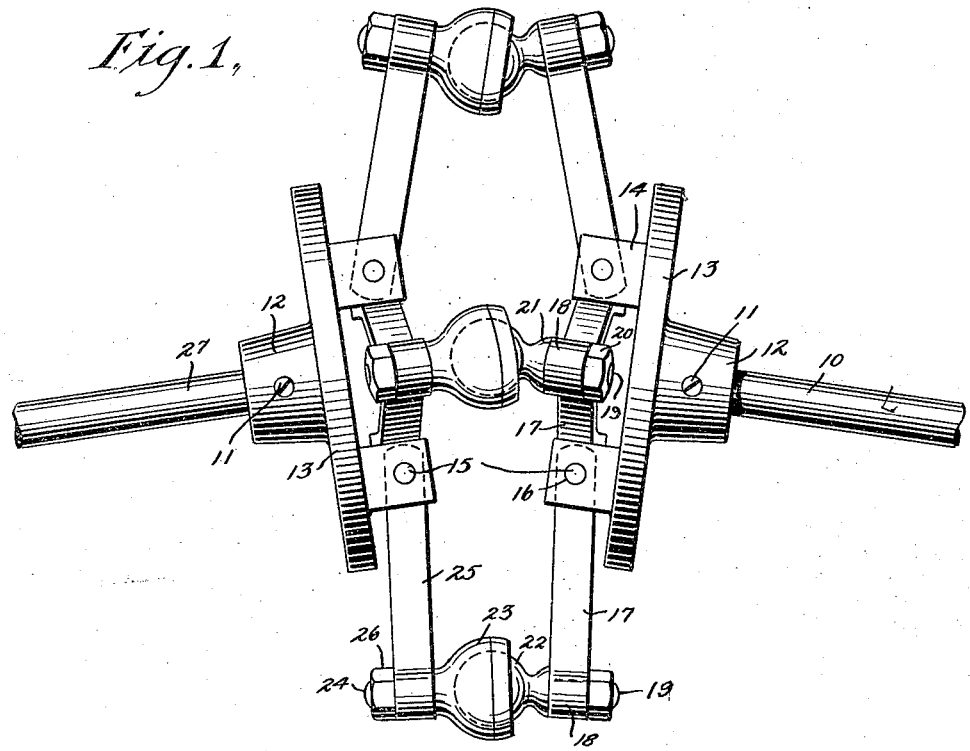
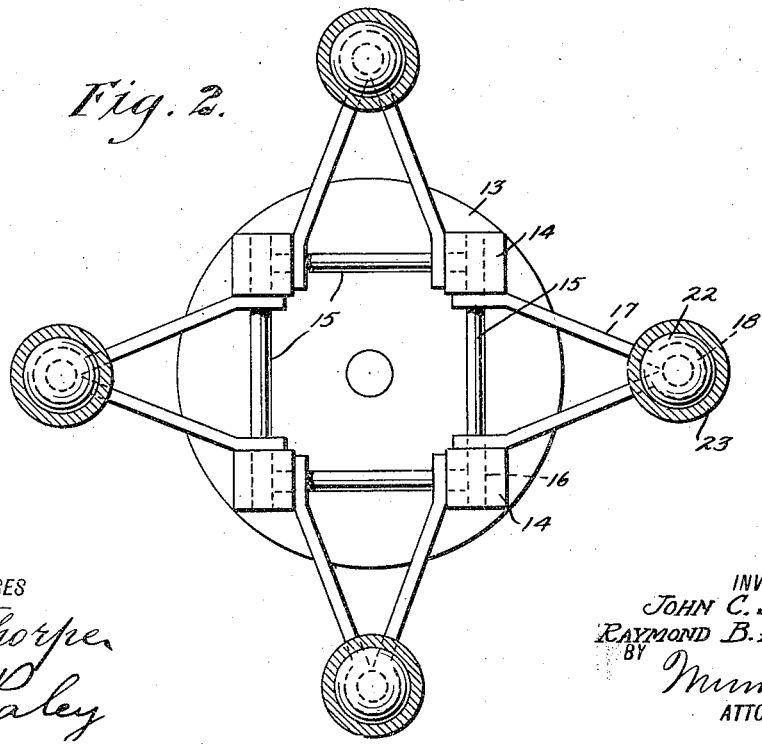
WITNESSES
Edw. Thorpe
L. A. Paley
INVENTORS
JOHN C. SHELER,
RAYMOND B. AUSTIN.
BY
Munn & Co.
ATTORNEYS

UNITED STATES PATENT OFFICE.

JOHN CALVIN SHELER AND RAYMOND BERT AUSTIN, OF CADILLAC, MICHIGAN.

FLEXIBLE COUPLING.

1,342,300.  Specification of Letters Patent.  Patented June 1, 1920.

Application filed November 19, 1919. Serial No. 339,056.

*To all whom it may concern:*

Be it known that we, JOHN C. SHELER and RAYMOND B. AUSTIN, citizens of the United States, and residents of Cadillac, in the county of Wexford and State of Michigan, have invented a new and Improved Flexible Coupling, of which the following is a full, clear, and exact description.

This invention relates to flexible couplings and has reference more particularly to a shaft coupling provided with a plurality of flexible joints so that power may be transmitted from one shaft to another shaft at a different angle or at variable angles thereto.

An object of this invention is to provide a shaft coupling of the class described which will noiselessly transmit power from one shaft to another shaft at an angle thereto.

Another object of this invention is to provide a shaft coupling of the class described which will transmit power from one shaft to a second shaft at an angle thereto so that the driven shaft will rotate smoothly and without vibration.

Reference is to be had to the accompanying drawing forming a part of this specification in which is understood the drawing is merely illustrative of one example of the invention and in which, Figure 1 is an elevation of the shaft coupling showing the driven shaft at an angle to the driving shaft.

Fig. 2 is a central sectional view through Fig. 1.

Reference is to be had to the accompanying drawing by numerals. 10 indicates a power shaft to which is fixed by any suitable means such as set screws 11 a collar 12, said collar being fixed coaxially to one face of a disk 13. A plurality of lugs 14 are fixed to the face of the disk 13 opposite the face carrying the collar 12, said lugs being preferably four in number arranged in the form of a square as shown in Fig. 2. The several lugs are connected by means of spindles 15 which are mounted in or fixed to said lugs by passing through preferably holes 16 drilled at right angles to each other through said lugs of approximately the size of said spindles, but small enough to fit said spindles tightly and prevent any axial movement thereof. Each spindle serves as a pivot for a V-shaped member 17 which is provided with an annular shaped portion 18 adjacent the point of the V, said portion serving as a seat for a bolt 19 which passes therethrough. Each bolt is held in position by means of a nut 20 screwed on the end thereof and a shoulder 21 is formed on said bolt and adapted to engage the portion 18. The end of the bolt 19 opposite the nut is provided with a ball 22 which engages a socket 23 so that said ball is loosely fitted in said socket and may be easily rotated therein. Formed on each of the sockets 23 is a bolt 24 which engages a V-shaped member 25 similar to the V-shaped members 17, said bolts being held in position by means of nuts 26. The V-shaped members 25 are pivotally mounted on a device which may be an exact counterpart of the parts already described which form the mounting for the V-shaped members 17. The last mentioned device has fixed to it a power shaft 27 which may serve either as a driven or a driving shaft, when shaft 10 serves as a driving or driven shaft respectively.

In operation the V-shaped members being pivotally mounted on the disks and also corresponding pairs of V-shaped members being connected together by means of universal joints, the two shafts are free to rotate at an angle to each other and said angle may be either fixed or variable.

We would state in conclusion that while the illustrated example constitutes a practical embodiment of our invention, we do not limit ourselves strictly to the mechanical details herein illustrated, since manifestly the same can be considerably varied without departure from the spirit of the invention as defined in the appended claims.

Having thus described our invention, we claim as new and desire to secure by Letters Patent:

1. In a flexible coupling, the combination of a driving element, a driven element, a supporting plate fixed to the end of each element, a plurality of hinge members pivotally mounted at one end around the periphery of each of said supporting plates and arranged so that said hinge members correspond in pairs, and a flexible joint connecting the free ends of each pair of said hinge members.

2. In a flexible coupling, the combination of a driving element, a driven element, a supporting member fixed to adjacent ends of each element, a plurality of V-shaped hinge members pivotally mounted at one end on each of said supporting members, said hinge members corresponding in pairs, and a ball and socket joint connecting the other ends of each pair of said hinge members.

3. In a flexible coupling, the combination of a driving element, a driven element, a disk fixed to one end of each element, a plurality of V-shaped hinge members pivotally mounted at one end on each of said disks, said hinge members corresponding in pairs, and a ball and socket joint connecting the other ends of each pair of said hinge members.

JOHN CALVIN SHELER.
RAYMOND BERT AUSTIN.